Figure 1:
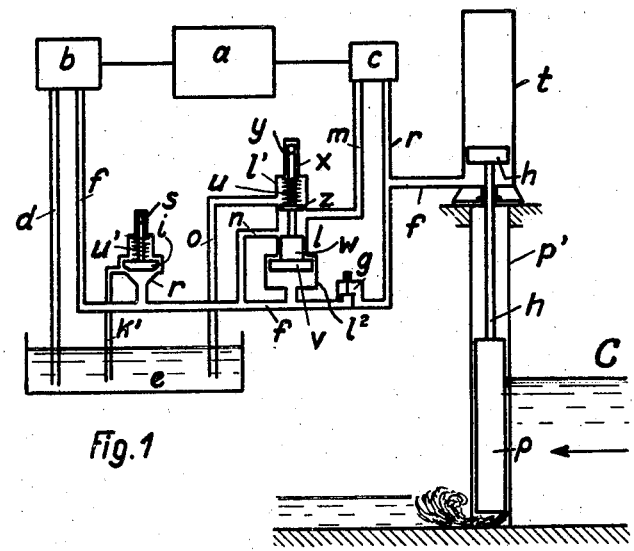

July 14, 1931.  H. A. RÖSLE  1,814,857

CONTROLLING APPARATUS FOR CONDUITS

Filed Dec. 1, 1928

Heinrich Adolf Rösle
by C. P. Goepel
his Attorney.

Patented July 14, 1931

1,814,857

UNITED STATES PATENT OFFICE

HEINRICH ADOLF RÖSLE, OF HEIDENHEIM-ON-THE-BRENZ, GERMANY, ASSIGNOR TO J. M. VOITH, OF HEIDENHEIM-ON-THE-BRENZ, GERMANY

CONTROLLING APPARATUS FOR CONDUITS

Application filed December 1, 1928, Serial No. 323,066, and in Germany November 28, 1927.

This invention relates to controlling apparatus for conduits for fluids and liquids, especially conduits provided with gates or the like for opening and closing said conduits, so that the flow of the fluid or liquid can be permitted to take place or be stopped at will.

An object of the invention is to provide such controlling apparatus of a design that enables the power to be more advantageously applied whenever the gates are to be operated so as to move to open position.

In pipes and conduits for supplying fluid to the inlets of turbines, etc., the gates when closed are subjected to the whole pressure of the fluid on one side thereof. Hence the closed gates are forced on the opposite sides against their supports; and the initial opening movement can only be produced with a great deal of friction and at a relatively large expenditure of power. After a gate or the like of this kind has been partly opened so that some of the water or other fluid in the conduit begins to pass it, the fluid occupies the space on the opposite or discharge side of the gate and then the pressure of the fluid as it flows past the gate drops.

These conditions require a relatively large motor for starting the gate on its opening movement; but as soon as such movement begins, the full power of the motor is no longer utilized; because the reduced pressure of the fluid permits the opening movement of the gate to be continued at a much smaller consumption of power than was needed at the outset.

A further disadvantage of such a construction resides in the fact that the gate cannot readily be accelerated in its opening movement but acts sluggishly and therefore the full force of the flow of the liquid through the conduit to the point where it is utilized cannot be quickly obtained.

An object of the present invention is to obviate these inconveniences and drawbacks. In practice the construction in which this invention is embodied embraces two power supplying devices for actuating a gate, with connections such that the opening movement of the gate can be more easily commenced and more readily continued. In the form of the invention herein set forth said power supplying devices may have the form of fluid motors arranged so that they can be connected in series and thus give a high pressure when the opening movement of the gate is caused to begin; then the fluid motors are automatically connected in parallel so that they operate at a lower pressure as the gate continues its movement, but deliver a larger volume of fluid; which takes effect to make the opening of the gate continue at greater speed, so that a saving of power is effected and the opening of the gate is accomplished with greater dispatch.

The changing of the fluid motors from a series connection to a parallel connection may be done by hand but is preferably accomplished by automatic means.

Further objects and advantages of the invention will be set forth in the accompanying drawings and the novel features of the invention are defined in the appended claims. The disclosure, however, is illustrative only and changes may be made in the parts employed or mode of proceeding without exceeding the scope of the invention or going beyond the principle underlying same.

Figure 2:
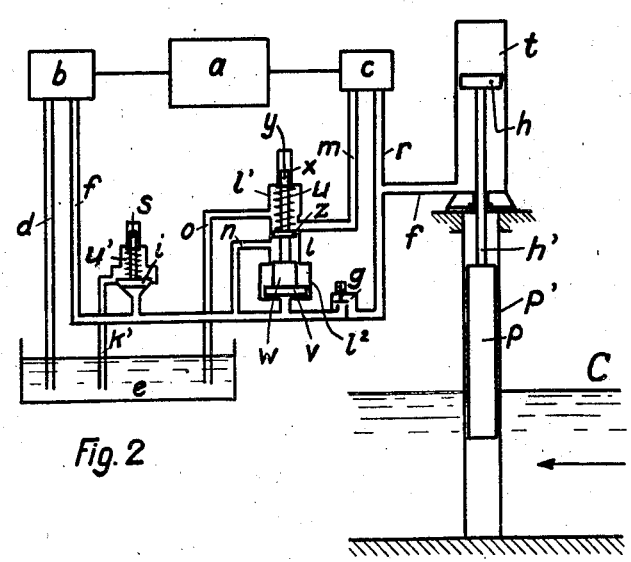

In the drawings,

Figure 1 illustrates an apparatus according to my invention with the closure gate for the conduit at the start of its opening position; and Figure 2 shows the same apparatus with the gate in substantially full open position.

The same numerals illustrate the same parts throughout.

In practice I employ two fluid pressure motors or power supplying devices such as pumps $b$ and $c$ which are operated by a single motor $a$. This motor may be an electric motor of the required capacity. The pump $b$ has a greater output than the pump $c$ and it is connected by means of a pipe $d$ to a tank $e$ which may contain oil or some other convenient pressure medium. The pump draws the liquid from the tank $e$ through the pipe $d$ into it and then discharges it through a pipe $f$ into the cylinder $t$ above the gate $p$. The gate $p$ is of the sliding type and moves up and down in guides $p'$ at its opposite side so as to permit fluid to flow through a conduit C when the gate is raised or stop the flow when it is lowered. The gate $p$ is connected to the piston $h$ in the cylinder $t$ by means of a piston rod $h'$. In line with the pipe $f$ is a check valve $g$.

The pipe $f$ also communicates with a casing $l$ which is situated between the pump $b$ and check valve $g$. This casing $l$ has a portion of relatively small diameter $l'$ and another portion of relatively large diameter $l^2$. It contains a differential piston, one portion $v$ being of greater diameter and disposed in the section $l^2$ which communicates directly with the pipe $f$; the other portion of the piston $w$ is of smaller diameter and projects into the section $l'$, the point of the union between the sections $l'$ and $l^2$ forming an inside shoulder so as to limit the upward movement of the differential piston. This piston is mounted upon a rod $y$ that slides at its end in a reduced extension $x$ at the opposite end of the section $l'$ and the rod carries a collar or valve $z$ between which and the end of the section $l$ is a spring $u$ carried around the rod so that normally the differential piston is held in a depressed position. From the pipe $f$ a branch pipe $n$ leads into the section $l'$, and a similar pipe $m$ unites this section to the pump $c$. Above the pipe $n$, a pipe $o$ connects the section $l'$ with the oil tank $e$. From the pump $c$ an exhaust pipe $r$ leads to the pipe $f$ near the point of entrance to the cylinder $t$.

The pipe $f$ also communicates with a safety valve in a casing $r$ between the casing $l$ and the pump $b$. This casing is connected by a pipe $k'$ to the oil tank $e$ and inside of the casing is the valve $i$ having a stem $s$. A spring $u'$ between the valve and the upper end of the casing surrounds the stem and normally tends to force the valve downward to closed position so that there is no flow through the pipe $k'$ to the oil tank $e$.

In operation, when the gate $p$ is in its lowermost position, stopping the flow of liquid through the conduit C, the liquid forces this gate on one side against the guide $p'$ as indicated in Figure 1. If the gate is to be lifted, the motor $a$ is started so as to work both the fluid motors or pumps $b$ and $c$; pump $b$ draws up liquid from the tank $e$ and forces it through the pipe $f$ into the cylinder $t$. On account of the resistance to the movement of the gate $p$ the liquid in the pipe $f$ is under high pressure and as a result it forces up the differential piston by acting on the end of the portion of greater diameter $v$. The spring $u$ is thus compressed and the valve $z$ uncovers the port leading to the pipe $m$; communication between the pipes $m$ and $o$ then being interrupted. Hence the fluid delivered by the pump $b$ instead of flowing directly to the cylinder $t$ is by-passed to the pump $c$, by pipes $m$ and $n$, and then is forced by the pump $c$ by way of the pipe $r$ and the end of the pipe $f$ into the cylinder $t$, lifting the piston $h$. At this time the high pressure produced by the two pumps, and particularly the additional pressure developed by the pump $c$, takes effect in the pipe $r$ and the part of the pipe $f$ between the valve $g$ and the cylinder $t$ to keep the check valve closed so that the necessary high pressure to lift the gate $p$ at the outset is secured. At this time the safety valve $i$ may open if necessary, the tension of the spring $u'$ being properly adjusted.

As soon as the movement of the gate $p$ begins, the fluid of course starts to flow and the space on the opposite or exhaust side of the gate begins to fill up. The pressure on the gate $p$ then drops and less power is now required to continue the lifting or opening movement. The pressure stored up in the fluid delivered by the pumps $b$ and $c$ in series to the cylinder $t$ under the piston $h$ continues to act and with the expansion of the fluid the valve $i$ can close and the spring $u$ can then distend itself and force down the differential piston together with the stem $y$ and valve $z$, so that communication is interrupted between the pipes $m$ and $n$ and the pipe $m$ connected with the pipe $o$. Thus the pump $c$ can draw up liquid from the tank $e$ and the output of the pump $b$ is passed wholly through the pipe $f$. The two pumps thus work in parallel, the pump $c$ delivering to the connection $r$ adjacent the point where the pipe $f$ enters the cylinder $t$. Thus a very great lifting force is obtained to continue the upward movement of the gate but no very great consumption of power at the motor $a$ takes place. The same arrangement in series with the pumps will be restored if on the upward movement of the gate $p$ the piston $h$ is checked.

Instead of the check valve $g$ another shut off device controlled by the piston in the casing $l$ may be utilized.

With this construction a more advantageous and economical operation of the gate $p$ can be produced as will be understood.

I claim:

1. Apparatus for actuating to open position the closure gate of a pressure fluid conduit comprising a pair of pumps, means for actuating the pumps, and connections comprising conduits and valves for enabling the pumps to be connected first in series to cause said gate to commence its opening movement and then in parallel to cause the gate to complete said movement.

2. Apparatus for actuating the closure gate of a pressure fluid conduit to open position comprising a pair of pumps, a motor to operate both of said pumps, a piston connected to said gate, a cylinder enclosing said piston and pipe connections containing automatic devices for enabling said pumps to work in series and deliver a fluid under relatively high pressure to said cylinder and then to connect themselves in parallel and deliver a large quantity of fluid at relatively low pressure to force the gate to complete its opening movement.

3. Apparatus for actuating to open position the closure gate of a pressure fluid conduit comprising a piston connected to said gate, a cylinder containing the piston, a pair of fluid pumps, a motor for operating both of said pumps, a pipe connecting one of said pumps to said cylinder, means forming a by-pass connecting the other pump to said pipe, and a differential piston controlled by the pressure in said pipe for opening and closing said by-pass.

4. The combination according to claim 3 wherein said pipe carries a safety valve between said by-pass and the first-named pump.

5. Apparatus for opening the closure gate of a pressure fluid conduit comprising a piston connected to said gate, a cylinder for said piston, a pair of pumps, a tank for a fluid pressure medium for said pumps, a pipe for connecting one of said pumps to said cylinder, a casing containing a differential piston connected to said pipe, and connections between said casing and said tank and the other pump whereby on the beginning of the opening movement of the closure the pumps will be in series and after the beginning of said opening movement they will work in parallel.

6. Apparatus for actuating to open position the closure gate of a pressure fluid conduit, comprising a piston connected to the gate, a cylinder for enclosing the piston, a pair of pumps, one of relatively large capacity, a motor for operating said pumps, a tank to contain a pressure fluid medium, a pipe for connecting the pump of larger capacity to said tank, another pipe connecting said pump to the cylinder, a check valve in said other pipe, a casing communicating directly with said other pipe, additional pipes connecting said casing to the other pump and to the pipe leading to the cylinder, a pipe connecting said casing to said tank, a differential piston in the casing, a valve in the casing connected to said differential piston and a safety valve connected to said tank and to the pipe leading to the cylinder at a point between said casing and the pump of larger capacity, so that in operation when the gate is to be opened the pump of larger capacity will deliver fluid into its pipe leading to the cylinder to act upon the piston in the casing to cause the valve in the casing to put the two pumps in series to start the gate, and after that the second pump will be put into communication directly with said tank so that the two pumps then operate in parallel to complete the opening movement of the gate.

7. Apparatus for actuating the closure gate of a pressure fluid conduit comprising a pair of pump devices, a single motor for operating said devices, a cylinder containing a piston connected with the gate, a main pipe connection between one of the devices of the cylinder, a pipe connection between the second device and said main pipe connection, a normally closed branch pipe connection between the main pipe connection and the second device, and means arranged to be operated by the pressure resulting from the resistance of the gate to movement for opening communication through the branch pipe connection.

In testimony that I claim the foregoing as my invention, I have signed my name hereto.

HEINRICH ADOLF RÖSLE.